(12) United States Patent
Luo et al.

(10) Patent No.: US 10,483,829 B2
(45) Date of Patent: Nov. 19, 2019

(54) BRUSH ASSEMBLY AND MOTOR USING SAME

(71) Applicant: Johnson Electric S.A., Murten (CH)

(72) Inventors: Qing Bin Luo, Shenzhen (CN); Chi Wai Lai, Hong Kong (CN); Xin Peng Wei, Shenzhen (CN); Gui Hong Tian, Shenzhen (CN); Bo Hu, Shenzhen (CN); Xiao Lin Ren, Shenzhen (CN); Wen Ming Wu, Shenzhen (CN)

(73) Assignee: Johnson Electric International AG, Murten (CH)

( * ) Notice: Subject to any disclaimer, the term of this patent is extended or adjusted under 35 U.S.C. 154(b) by 400 days.

(21) Appl. No.: 15/447,750

(22) Filed: Mar. 2, 2017

(65) Prior Publication Data

US 2017/0257009 A1 Sep. 7, 2017

(30) Foreign Application Priority Data

Mar. 2, 2016 (CN) .......................... 2016 1 0119458

(51) Int. Cl.
*H02K 11/02* (2016.01)
*H02K 5/14* (2006.01)
*H02K 5/22* (2006.01)
*H02K 13/10* (2006.01)
*H02K 11/215* (2016.01)
*H02K 11/25* (2016.01)

(52) U.S. Cl.
CPC ............ *H02K 11/02* (2013.01); *H02K 5/148* (2013.01); *H02K 5/225* (2013.01); *H02K 13/10* (2013.01); *H02K 11/215* (2016.01); *H02K 11/25* (2016.01)

(58) Field of Classification Search
CPC ........ H02K 5/148; H02K 5/225; H02K 11/02; H02K 11/026; H02K 11/215; H02K 11/25; H02K 13/10; H02K 13/00; H01G 2/06; H01G 4/28
USPC ..................................... 310/51, 71, 239, 242
See application file for complete search history.

(56) References Cited

U.S. PATENT DOCUMENTS 2,769,944 A * 11/1956 Stein ........................ H01G 4/28
361/307
4,700,156 A * 10/1987 Blamire ................... H01G 4/40
29/25.42

(Continued)

FOREIGN PATENT DOCUMENTS

CN 102593997 A 7/2012
CN 202818011 U 3/2013

*Primary Examiner* — Mang Tin Bik Lian
*Assistant Examiner* — Ahmed Elnakib
(74) *Attorney, Agent, or Firm* — Muncy, Geissler, Olds & Lowe, P.C.

(57) ABSTRACT

A brush assembly includes a circuit board, at least two brushes, power connecting terminals for connecting with an external power supply, and a power supply branch circuit connected in series between a corresponding one of the power connecting terminals and a corresponding one of the brushes. The brush assembly further comprises an EMI suppressor connected between the power supply branch circuit and ground. The EMI suppressor is an axial capacitor formed by a conductor core, a cover, and a filling medium. The cover is attached around the conductor core, and the filling medium is filled between the conductor core and the cover. A motor utilizing the brush assembly is also provided.

12 Claims, 9 Drawing Sheets

(56) References Cited

U.S. PATENT DOCUMENTS

| | | | | |
|---|---|---|---|---|
| 6,858,955 | B2 * | 2/2005 | Lau | H01R 39/24 |
| | | | | 310/239 |
| 8,289,105 | B2 * | 10/2012 | Chereson | H01C 7/10 |
| | | | | 333/182 |
| 8,373,317 | B2 * | 2/2013 | Hicks | H02K 11/026 |
| | | | | 310/249 |
| 8,552,615 | B2 * | 10/2013 | Zhao | H02K 11/026 |
| | | | | 310/239 |
| 2002/0047471 | A1 * | 4/2002 | Sik Lau | H01R 39/24 |
| | | | | 310/239 |
| 2004/0232784 | A1 * | 11/2004 | Thomson | H02K 11/024 |
| | | | | 310/68 R |
| 2005/0239331 | A1 * | 10/2005 | Bourdykina | H02K 5/225 |
| | | | | 439/620.29 |
| 2005/0280976 | A1 * | 12/2005 | Abbott | H01G 4/248 |
| | | | | 361/301.3 |
| 2007/0210672 | A1 * | 9/2007 | Fleminger | H01R 39/385 |
| | | | | 310/239 |
| 2007/0295135 | A1 * | 12/2007 | Kidowaki | F16H 1/16 |
| | | | | 74/425 |
| 2009/0295241 | A1 * | 12/2009 | Wong | H02K 11/026 |
| | | | | 310/72 |
| 2011/0140554 | A1 * | 6/2011 | Wong | H02K 1/17 |
| | | | | 310/72 |
| 2012/0175980 | A1 * | 7/2012 | Zhang | H02K 5/145 |
| | | | | 310/71 |
| 2013/0307380 | A1 * | 11/2013 | Zeng | H02K 11/026 |
| | | | | 310/68 R |
| 2017/0257009 | A1 * | 9/2017 | Luo | H02K 5/148 |

* cited by examiner

BRUSH ASSEMBLY AND MOTOR USING SAME

CROSS REFERENCE TO RELATED APPLICATIONS

This non-provisional patent application claims priority under 35 U.S.C. § 119(a) from Patent Application No.201610119458.8 filed in The People's Republic of China on Mar. 2, 2016.

FIELD OF THE INVENTION

This invention relates to motors, and in particular to a brush assembly and a motor utilizing the brush assembly.

BACKGROUND OF THE INVENTION

A brush direct current motor includes a stator and a rotor rotatably mounted to the stator. The rotor includes a shaft, a commutator fixed to the shaft, a rotor core, and rotor windings wound around the rotor core and electrically connected with segments of the commutator. The motor further includes a brush assembly. The brush assembly includes brushes electrically connected with the commutator segments. When the rotor operates, the rotor rotates at high speed relative to the stator, frequent altering of polarities of the rotor windings generates high frequency signals which are radiated from the motor and, as a result, the motor causes an electromagnetic interference (EMI).

SUMMARY OF THE INVENTION

Thus there is a desire for a brush assembly that can reduce noise and vibration.

There is also a desire for a motor utilizing the above brush assembly.

In one aspect, a brush assembly is provided which includes a circuit board, at least two brushes, a plurality of power connecting terminals for connecting with an external power supply, and a power supply branch circuit connected in series between a corresponding one of the power connecting terminals and a corresponding one of the brushes. The brush assembly further comprises an EMI suppressor connected between the power supply branch circuit and ground. The EMI suppressor is an axial capacitor formed by a conductor core, a cover, and a filling medium.

Preferably, the cover is attached around the conductor core, and the filling medium is filled between the conductor core and the cover.

Preferably, a motor is provided which includes an housing, a rotor assembly, a stator assembly, a commutator, an end cap assembly, and a brush assembly. The rotor assembly and the stator assembly are mounted in the housing. The end cap assembly is mounted to one side of the housing. The brush assembly comprises a circuit board, at least two brushes, a plurality of power connecting terminals for connecting with an external power supply, and a power supply branch circuit connected in series between a corresponding one of the power connecting terminals and a corresponding one of the brushes. The brush assembly further comprises an EMI suppressor connected between the power supply branch circuit and ground. The EMI suppressor is an axial capacitor formed by a conductor core, a cover, and a filling medium.

Preferably, the cover is attached around the conductor core, and the filling medium is filled between the conductor core and the cover.

Preferably, the rotor assembly comprises a shaft and a rotor core, one end of the shaft is rotatably received in the housing, and the other end sequentially passes through the rotor core and the commutator and is rotataly received in the end cap assembly; the commutator is mounted on the shaft, the commutator is electrically connected with the rotor assembly and slidably connected with the brush assembly so as to electrically connect the rotor assembly to the external power supply.

Preferably, the end cap assembly comprises an end cap portion and a bearing seat. The brush assembly is mounted on the end cap assembly. The bearing seat is configured to receive a bearing for supporting the rotor assembly for rotation in the bearing.

Preferably, the end cap portion defines a first receiving chamber and a second receiving chamber at two sides thereof, and defines a through hole in communication with the first receiving chamber and the second receiving chamber. A bearing seat accommodating portion is defined in the first receiving chamber. The bearing seat comprises a plate member and a bearing sleeve disposed on the plate member, the plate member is disposed between the first receiving chamber and a bottom wall of the second receiving chamber, and the bearing sleeve is accommodated in the bearing seat accommodating portion.

Preferably, the brush assembly further comprises at least two inductors, each inductor is connected in series to a corresponding power supply branch circuit, the two inductors are parallel to each other and are received in the first receiving chamber, and the two inductors are located at two sides of the bearing seat accommodating portion.

Preferably, a commutator accommodating portion and at least two brush holders are disposed in the second receiving chamber. The commutator accommodating portion is in communication with and coaxially arranged with the bearing seat accommodating portion, and the commutator is received in the commutator accommodating portion.

Preferably, the two brush holders are symmetrically disposed at a circumferential side of the commutator accommodating portion. Each brush holder is in communication with the commutator accommodating portion.

Preferably, the brush assembly comprises at least one thermal switch connected between one corresponding brush and one corresponding EMI suppressor.

Preferably, a plurality of locking portions is disposed at the bottom wall of the second receiving chamber. The locking portions and the bottom wall and a sidewall of the second receiving chamber cooperatively define a receiving space, and the locking portions engage with the thermal switch to fix the thermal switch in the receiving space.

Preferably, a plurality of contacting tabs is disposed on the plate member. One side of the circuit board is provided with an earth line. Some of the contacting tabs pass through the first receiving chamber to connect to the earth line, and some other contacting tabs are connected to the housing.

Preferably, the brush assembly comprises a sensor assembly mounted to one side of the circuit board. The sensor assembly comprises a Hall sensor, and the Hall sensor is connected to the external power supply.

Preferably, the end cap portion defines at least two through holes passing through the end cap portion and in communication with the first receiving chamber and the second receiving chamber. The plate member defines engagement holes coaxial with the through holes, and each EMI suppressor is received in one corresponding through hole and one corresponding coaxial engagement hole.

In the motor of the embodiments of the present invention, an EMI suppressor is connected in series in each power supply branch circuit of the brush assembly, and the EMI suppressors are located on the main body opposite from the extension, such that the circuit has an enhanced anti-EMI capability.

Below, embodiments of the present invention will be described in detail with reference to the accompanying drawings.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component, i.e. indirectly fixed to the another component through a third component. When a component is described to be "connected" to another component, it can be directly connected to the another component or there may be an intermediate component. When a component is described to be "disposed" on another component, it can be directly disposed on the another component or there may be an intermediate component.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Figure 1:
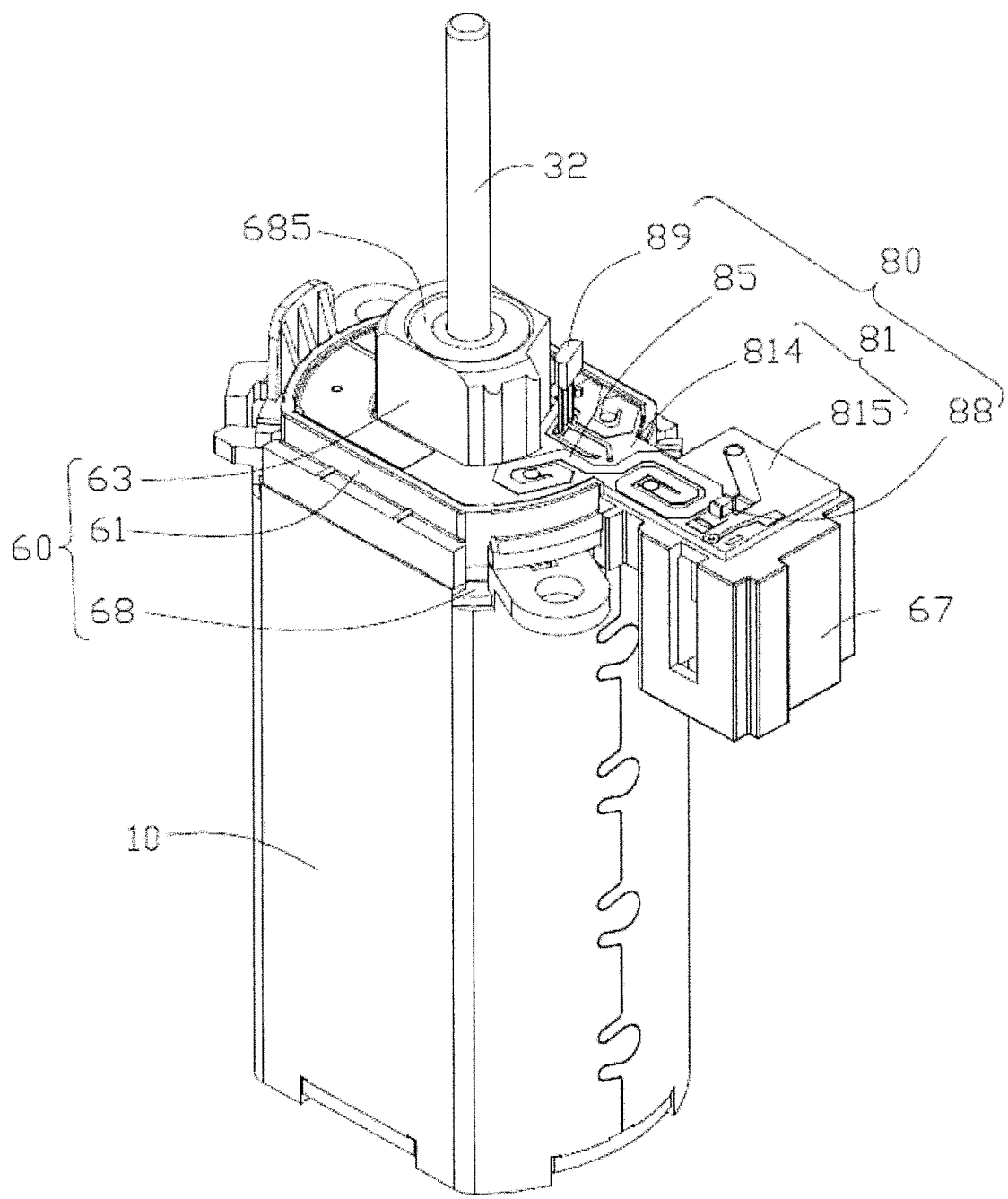
FIG. 1 is an assembled view of a motor according to a preferred embodiment of the present invention.
Figure 2:
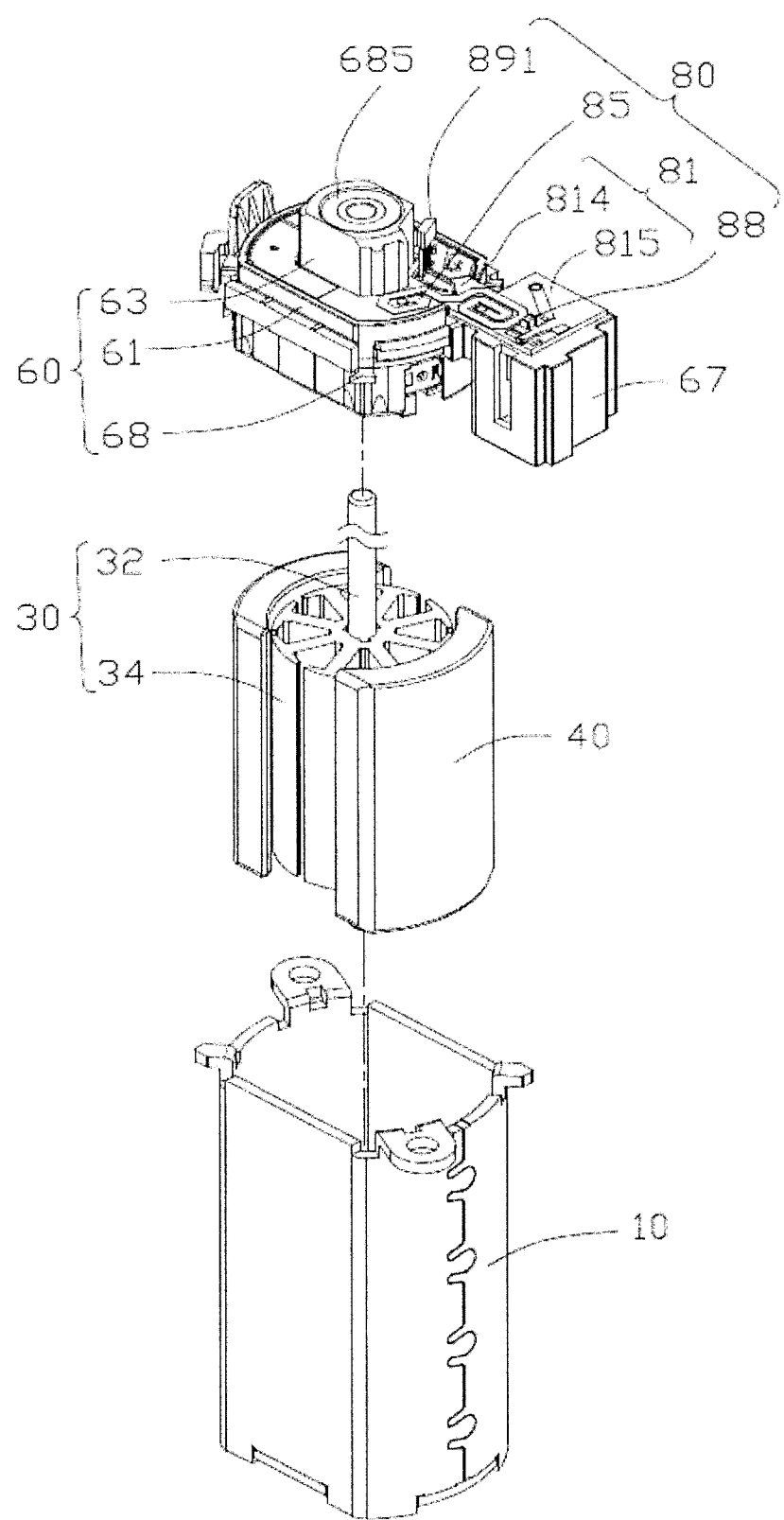
FIG. 2 is a partially exploded view of the motor of FIG. 1.

Referring to FIG. 1 and FIG. 2, a motor 100 in accordance with a preferred embodiment of the present invention is a brushed motor. The motor 100 includes a housing 10, a rotor assembly 30, a stator assembly 40, a commutator 50 (FIG. 3), an end cap assembly 60, and a brush assembly 80. The rotor assembly 30 and the stator assembly 40 are mounted in the housing 10. The commutator 50 is mounted on the rotor assembly 30 and rotates along with the rotor assembly 30. The end cap assembly 60 is mounted to one end of the housing 10, and the brush assembly 80 is slidably and electrically connected with the commutator 50.

In this embodiment, the housing 10 is a cylindrical structure with an open end. A closed end of the housing 10 is mounted with a bearing (not shown) for rotatably receiving the rotor assembly 30 therein, and the other end is the open end.

The rotor assembly 30 includes a rotor core 34 and a shaft 32 to be driven by the rotor core 34. One end of the shaft 32 is rotatably mounted in the bearing, and the other end is rotatably mounted in the end cap assembly 60. The rotor core 34 is received in the stator assembly 40 and is wounded with windings (not shown). In this embodiment, the stator assembly 40 includes at least two permanent magnets. Magnetic fields of the rotor assembly 30 and the stator assembly 40 interact with each other to drive the rotor assembly 30 to rotate.

Figure 3:
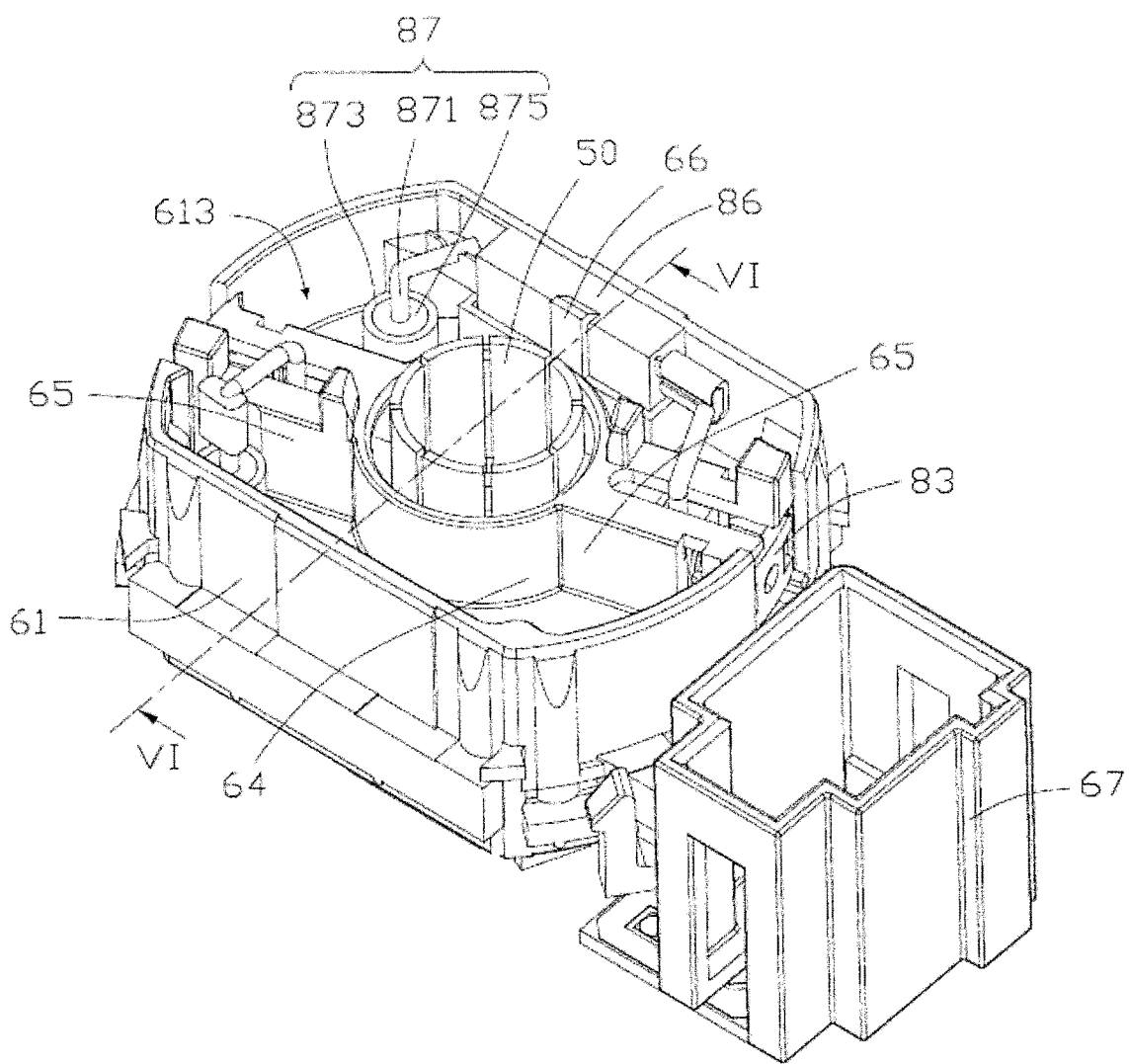
FIG. 3 is an assembled view of an end cap assembly and a brush assembly of the motor of FIG. 1.

Referring also to FIG. 3, the commutator 50 is mounted on the shaft 32. The commutator 50 is connected with windings of the rotor assembly 30 and also slidably connected with the brush assembly 80 so as to electrically connect the windings to an external power supply. In this embodiment, the commutator 50 is rotatably mounted in the end cap assembly 60.

Figure 4:
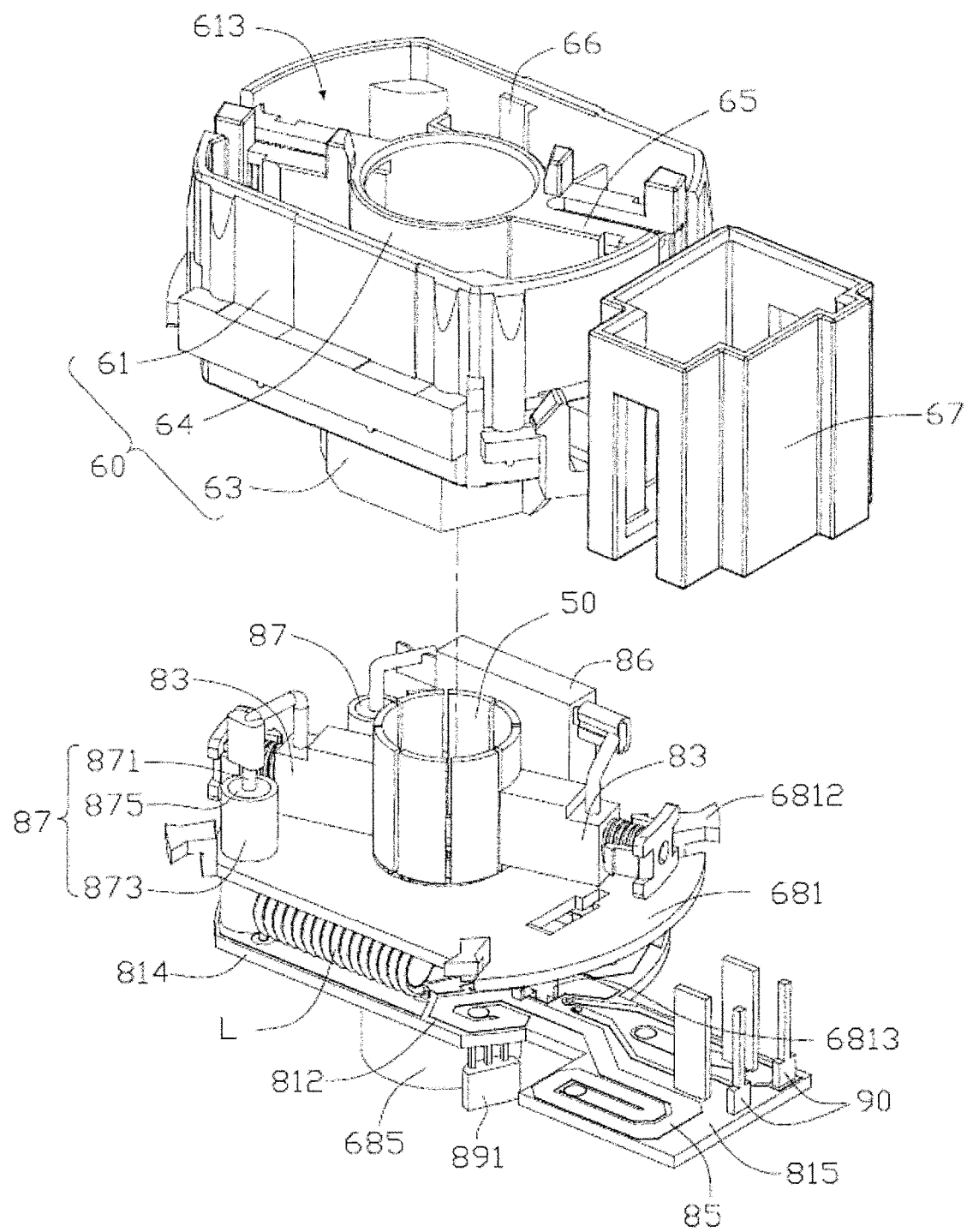
FIG. 4 is a partially exploded view of the end cap assembly and the brush assembly of the motor of FIG. 3.
Figure 5:
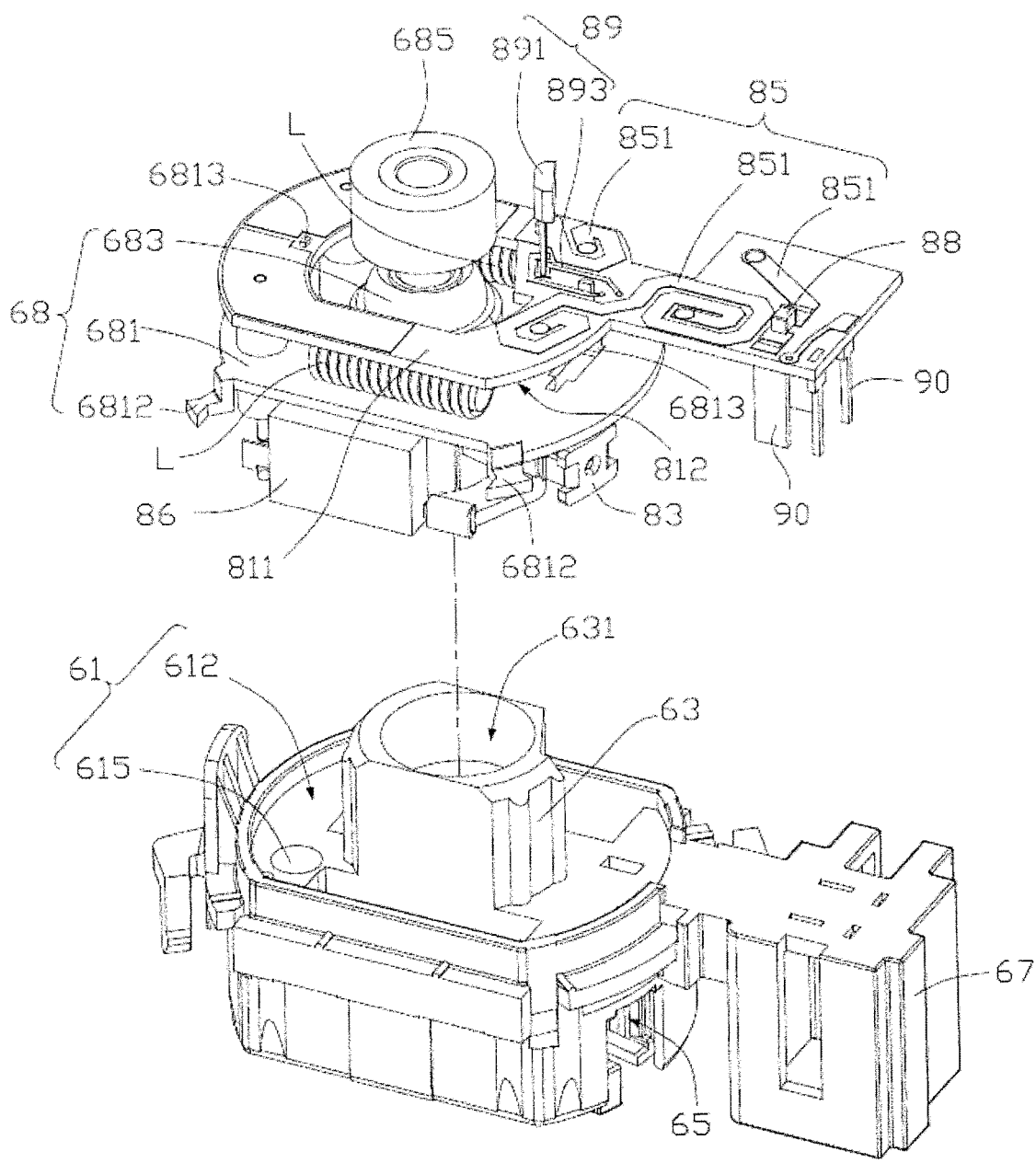
FIG. 5 is a partially exploded view of the end cap assembly and the brush assembly of the motor of FIG. 2, viewed from another aspect.

Referring to FIG. 4 and FIG. 5, the end cap assembly 60 is used to rotatably support the rotor assembly 30 and support the brush assembly 80. The end cap assembly 60 includes an end cap portion 61 and a bearing seat 68 formed in the end cap portion 61. The end cap portion 61 is used to support components of the brush assembly 80, and the bearing seat 68 is used to rotatably support and receive the rotor assembly 30 therein. In this embodiment, the end cap portion 61 and the bearing seat 68 are integrally formed to ensure that the end cap portion 61 and the bearing seat 68 are fixed relative to each other such that the rotor assembly 30 has better stability during rotation.

It should be understood that the end cap portion 61 and the bearing seat 68 may be formed as follows. The end cap portion 61 is injection-molded on the bearing seat 68, with the bearing seat 68 being embedded in the end cap portion 61. In this embodiment, the end cap portion 61 is made of plastic, and the bearing seat 68 is made of a hard wear-resistant material such as cast iron.

In this embodiment, the end cap portion 61 is of a generally cuboid structure, with a first receiving chamber 612 and a second receiving chamber 613 (FIG. 6) respectively defined in two sides of the end cap portion 61, for receiving the brush assembly 80. The end cap portion 61 further defines at least two through holes 615 passing through the end cap portion 61 and in communication with the first receiving chamber 612 and the second receiving chamber 613.

A bearing seat accommodating portion 63 extends from a bottom of the first receiving chamber 612 in a direction away from the second receiving chamber 613. In this embodiment, the bearing seat accommodating portion 63 is used to mount the bearing seat 68. The bearing seat accommodating portion 63 is of a hollow cylindrical structure having an interior structure matching the bearing seat 68 in shape, such that the bearing seat 68 can be fixedly received in the bearing seat accommodating portion 63. The bearing seat accommodating portion 63 defines a mounting hole 631 in one end thereof opposite from the first receiving chamber 612. The mounting hole 631 is used for mounting of the bearing 685 which rotatably supports the shaft 32.

A commutator accommodating portion 64 and at least two brush holders 65 extend from a bottom of the second receiving chamber 613 in a direction away from the first receiving chamber 612. In this embodiment, the commutator accommodating portion 64 is of a generally hollow cylindrical structure, which is in communication with and coaxially arranged with the bearing seat accommodating portion 63. The commutator accommodating portion 64 is used to receive the commutator 50. In this embodiment, the two brush holders 65 are disposed at a circumferential side of the commutator accommodating portion 64 and symmetrical about a center of the commutator accommodating portion 64. Each brush holder 65 is in communication with the commutator accommodating portion 64, for allowing the brush assembly 80 to slidably and electrically connect with the commutator 50.

A plurality of locking portions 66 are disposed at the bottom of the second receiving chamber 613. In this embodiment, the locking portions 66 and a bottom wall and sidewall of the second receiving chamber 613 cooperatively define a receiving space for receiving part of components of the brush assembly 80. In another embodiment, the receiving space may also be formed by a structure which separately extends from the bottom wall or the sidewall and has a receiving space.

A receiving portion 67 extends from one side of the end cap portion 61 in a radial direction away from the end cap portion 61. One end surface of the receiving portion 67 is parallel to the bottom of the first receiving chamber 612. The receiving portion 67 cooperates with the first receiving chamber 612 for supporting the brush assembly 80.

The bearing seat 68 includes a plate member 681 and a bearing sleeve 683 disposed at a generally middle area of the plate member 681. The plate member 681 is disposed between the first receiving chamber 612 and the bottom of the second receiving chamber 613, and the bearing sleeve 683 is in communication with and coaxially arranged with the bearing accommodating portion 63 and the commutator accommodating portion 64. A plurality of contacting tabs 6812 and a plurality of supporting members 6813 are disposed on the plate member 681. In this embodiment, each contacting tab 6812 is formed by bending an extension of the plate member 681 at a preset location of the plate member 681. In this embodiment, the extensions are located at generally four corners of the plate member 681. The contacting tabs 6812 connect to the housing 10 for grounding. In this embodiment, some contacting tabs 6812 pass through the first receiving chamber 612 to connect to the brush assembly 80, and some other contacting tabs 6812 connect to the housing 10. Each support member 6813 extends perpendicular from the plate member 681. One end of each support member 6813 passes through the bottom wall of the first receiving chamber 612 to connect to a circuit board 81, thereby fixing and positioning the circuit board 81 in the first receiving chamber 612. In this embodiment, each support member 6813 is formed by punching the plate member 681 and then bending the punched part. In other embodiments, the support members 6813 may also be fixed on the plate member 681 by soldering, riveting or adhering.

The plate member 681 further defines a plurality of engagement holes (unlabeled), and the number of the engagement holes is same as the number of EMI suppressor 87. Each engagement hole is coaxial with one of the through holes 615. Each engagement hole allows one of the EMI suppressors 87 to pass therethrough and cooperates with the corresponding through hole 615 to fix and connect the corresponding EMI suppressor 87 to ground.

The brush assembly 80 includes the circuit board 81, the plurality of brushes 83, two inductors L mounted on the circuit board 81, at least one thermal switch 86, two EMI suppressors 87, capacitors 88, a sensor assembly 89, and a plurality of power connecting terminals 90. In this embodiment, the circuit board 81 has a first end surface 811 (FIG. 5) and a second end surface 812 opposite from each other.

In this embodiment, the circuit board 81 includes a main body 814 mounted in the first receiving chamber 612 and an extension portion 815 disposed at one side of the main body 814 and mounted on the receiving portion 67. In this embodiment, a shape of the main body 814 is generally same as a shape of the end cap portion 61. Ends of the contacting tabs 6812 pass through the bottom wall of the first receiving chamber 612 to connect to the main body 814.

Each brush 83 is mounted in a corresponding brush holder 65, with one end of the brush 83 slidably and electrically connected with the commutator 50, and the other end electrically connected to one end of a corresponding one of power supply branch circuits 85. In this embodiment, the number of the brushes 83 is two, and mounting locations of the two brushes 83 are spaced 180 degrees.

In this embodiment, the one of the power supply branch circuits 85 includes one of the brushes 83 (positive brush), one of the inductors L, the thermal switch 86, one EMI suppressors 87, and one power connecting terminals 90 which acts as a positive pole. Another power supply branch circuit 85 includes the other of the brushes 83 (negative brush), the other of the inductors L, the other EMI suppressor 87, and the other power connecting terminals 90 which acts as a negative pole.

It should be understood that the electronic components of each power supply branch circuit 85 may be electrically connected via electric wires including layout traces 851 printed on the first end surface 811 and the second end surface 812 of the circuit board 81 and a conducting wire connected to the brush 83. The layout wires 851 are preferably made from copper foils, and layout paths of the layout traces 851 can be determined by locations of the components on the circuit board 81. The layout traces 851 can for example be laid out in straight lines or curved lines, and can also be laid out on both surfaces of the first end surface 811 and the second end surface 812 of the circuit board 81.

The thermal switch 86 is mounted in the second receiving chamber 613. The locking portions 66 engage with the thermal switch 86 to fix the thermal switch 86. The thermal switch 86 is disposed in a branch circuit that connects the positive connecting terminal and the positive brush, with one end of the thermal switch 86 connected to one of the brushes 83, and the other end electrically connected to the one of the EMI suppressors 87.

In this embodiment, the two inductors L are parallel to each other and are received in the first receiving chamber 612. The two inductors L are located at two sides of the bearing seat receiving portion 63.

Each EMI suppressor 87 is received in a corresponding one of the through holes 615. One end of one EMI suppressor 87 is electrically connected to one of the inductors L, and the other end is electrically connected to the negative brush 83. One end of the other EMI suppressor 87 is electrically connected to the other of the inductors L, and the other end is electrically connected to the thermal switch 86.

Each EMI suppressor 87 includes a conductor core 871, a cover 873 attached around the conductor core 871, and a filling medium 875 filled between the conductor core 871 and the cover 873. The cover 873, the conductor core 871 and the filling medium 875 form an axial capacitor. And the cover 873 and the conductor core 871 act as two electrodes of the axial capacitor. The conductor core 871 passes through the cover 873, one end of the conductor core 871 is electrically connected to the corresponding inductor L through the layout traces 851 on the circuit board 81, and the other end is electrically connected to the brush 83 or the thermal switch 86. The filling medium 875 is made from an electrically non-conductive material and is filled between the conductor core 871 and the cover 873 such that the conductor 871 and the cover 873 are coaxially arranged. In this embodiment, the cover 873 is a hollow cylinder, and one end of the cover 873 adjacent the inductor L is connected to the corresponding contacting tabs 6812 for grounding by contacting an earth line (not shown) on the main body 814. The cover 873 is fixed in the through hole 615 and connected to the earth line on the circuit board 81 and the plate member 681 for grounding. The EMIs produced by the motor 100 can be grounded through the EMI suppressors 87, the end cap portion 61 and the earth lines. Further, the two EMI suppressors 87 are located at one side of the main body 814 opposite from the extension 815.

It should be understood that the conductor core 871 and the cover 873 are opposing electrodes of the axial capacitor. The provision of the capacitors can reduce the ground impedance when compared against the situation where no such capacitor is provided.

In this embodiment, the number of the capacitors 88 is three. One capacitor 88 is connected between the positive and negative power connecting terminals 90. Each of the other capacitors 88 has one end connected to one power supply branch circuit 85 and the other end connected to the earth line to obtain improved filtering results.

The sensor assembly 89 includes a Hall sensor 891 and a circuit 893. The Hall sensor 891 is electrically connected to the two of the power connecting terminals 90 to receive power through the circuit 893 on the circuit board 81. In this embodiment, the number of the power connecting terminals 90 is four, two of the power connecting terminals 90 are respectively connected to two power supply branch circuits 85, and the other two power connecting terminals 90 are respectively connected to two ends of the circuit 893.

Figure 6:
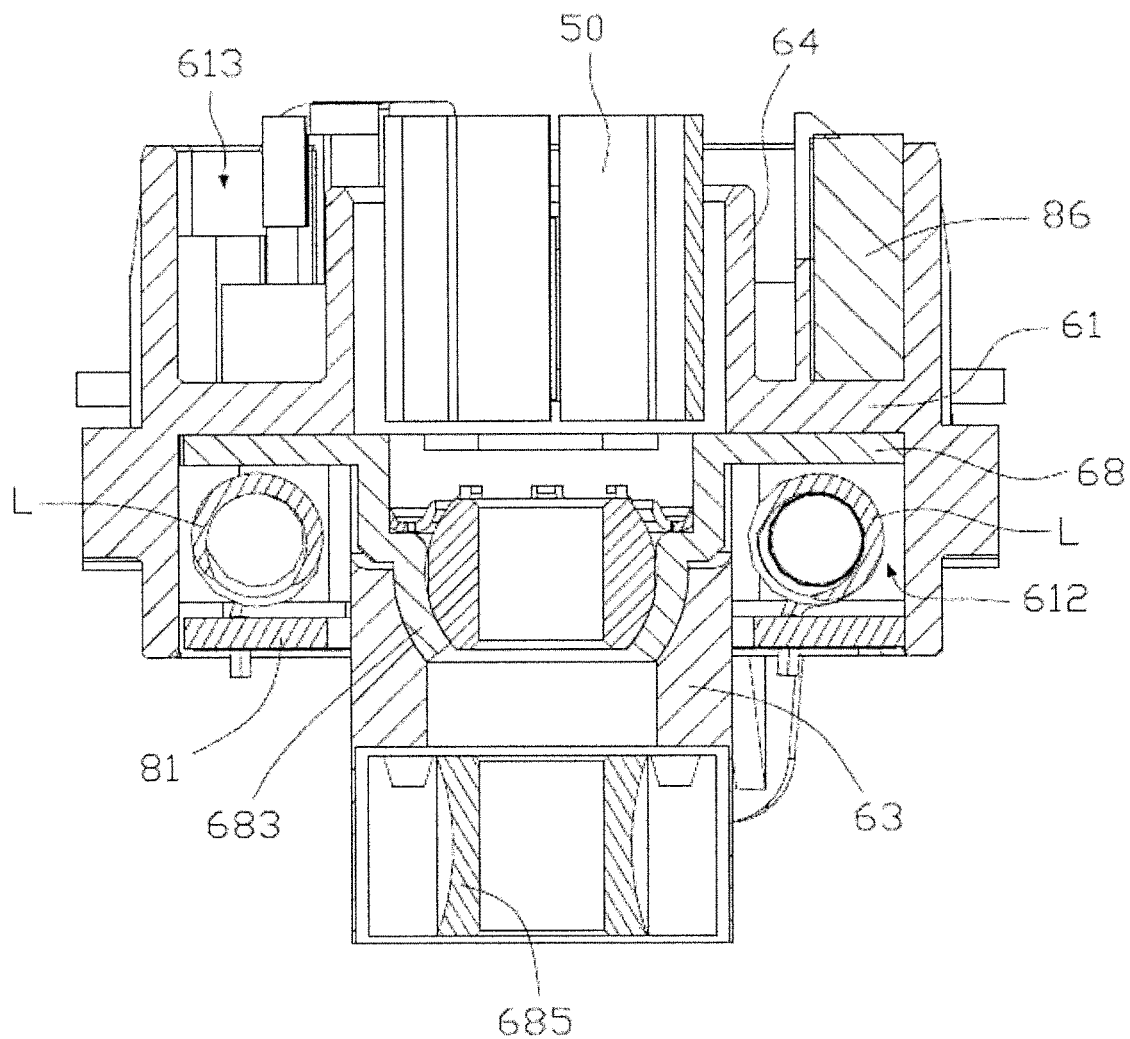
FIG. 6 is a sectional view of the end cap assembly and the brush assembly of FIG. 3, taken along line VI-VI thereof.

Referring also to FIG. 6, the end cap assembly 60 is mounted to the open end of the housing 10, with the brushes 83 received between the end cap assembly 60 and the housing 10. The shaft 32 sequentially passes through the rotor core 34 and the commutator 50 and is mounted in the bearing disposed in the bearing seat 68. The power connecting terminals 90 are received in the receiving portion 67.

Figure 7:
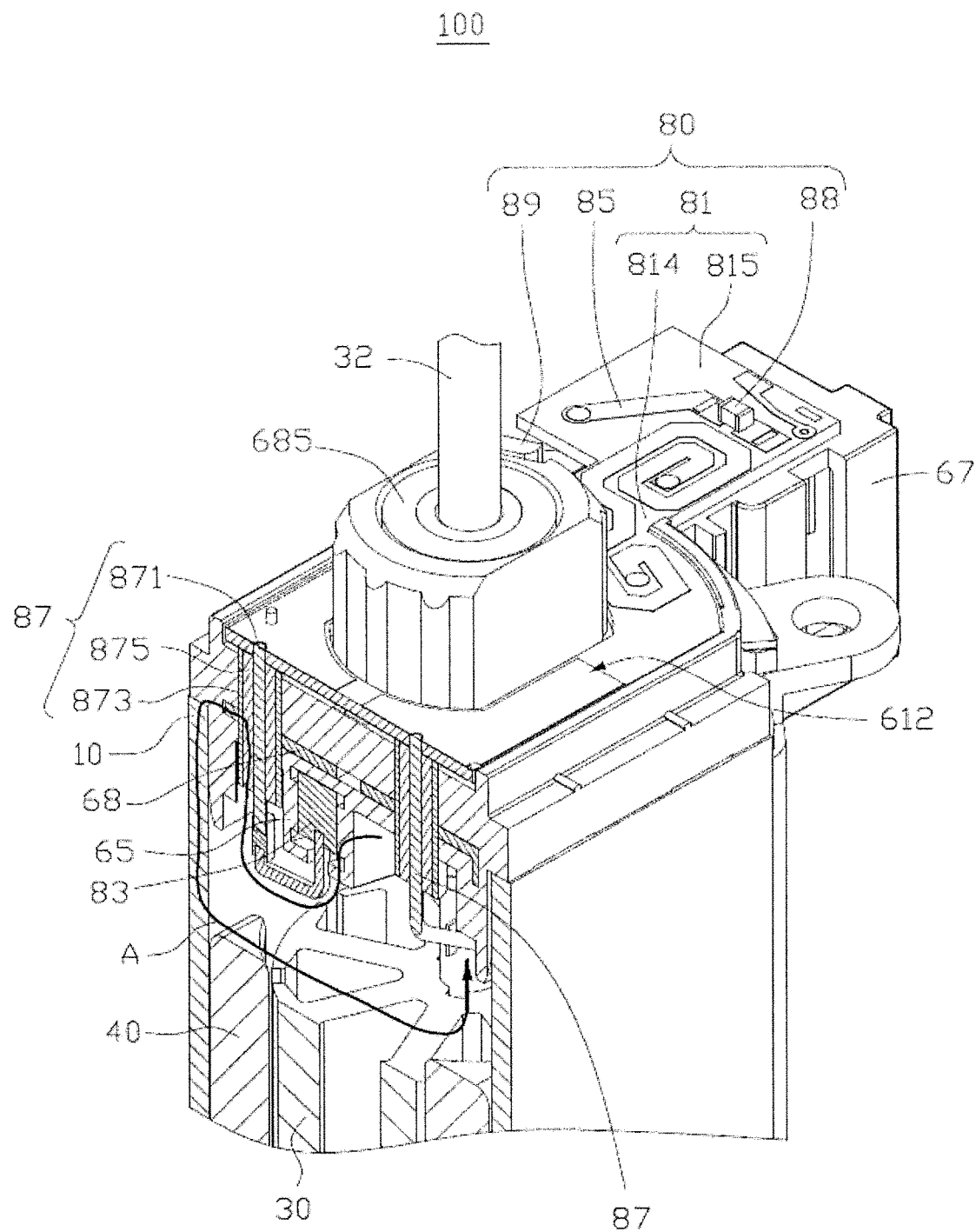
FIG. 7 is a partially sectional view of the motor of FIG. 1.

Referring to FIG. 7, the line A represents a travel path of the EMIs generated by one brush 83 of the motor 100 according to the invention. As can be seen, the EMIs generated by the brush 83 are routed to the housing 10 through the plate member 681 under the guide of the EMI suppressor 87. As such, the EMIs travel along the designed path, thereby avoiding interference to other electronic components.

Figure 8:
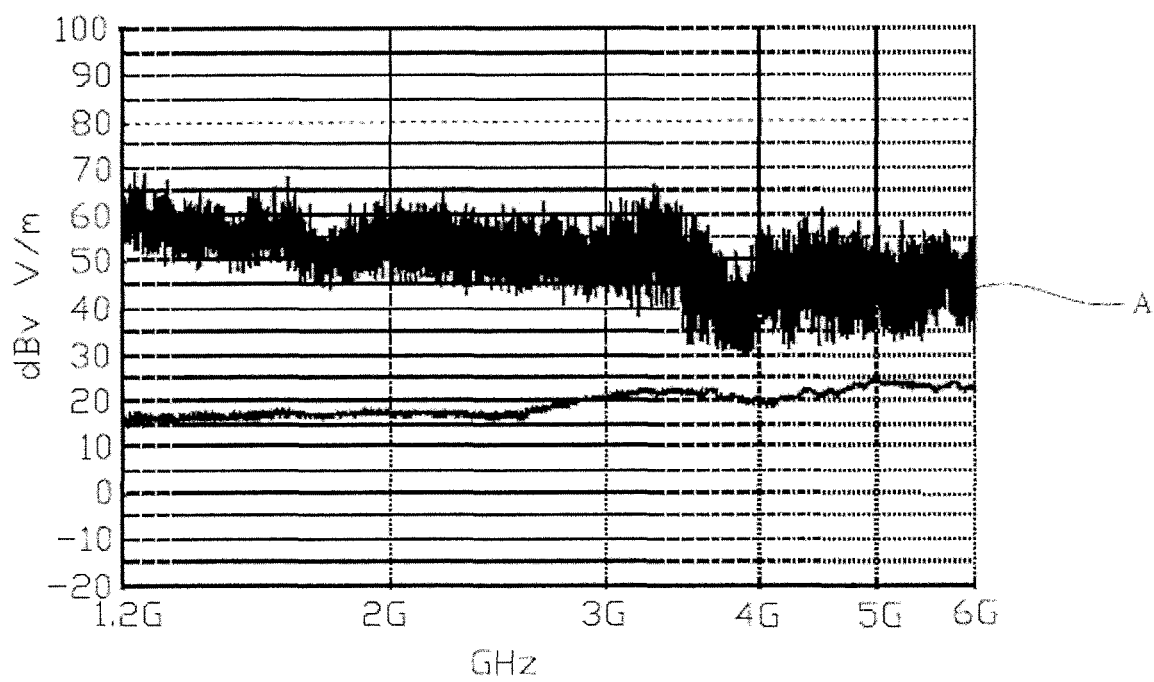
FIG. 8 is a diagram illustrating radiated EMI and conducted EMI test results of the motor of FIG. 1.
Figure 9:
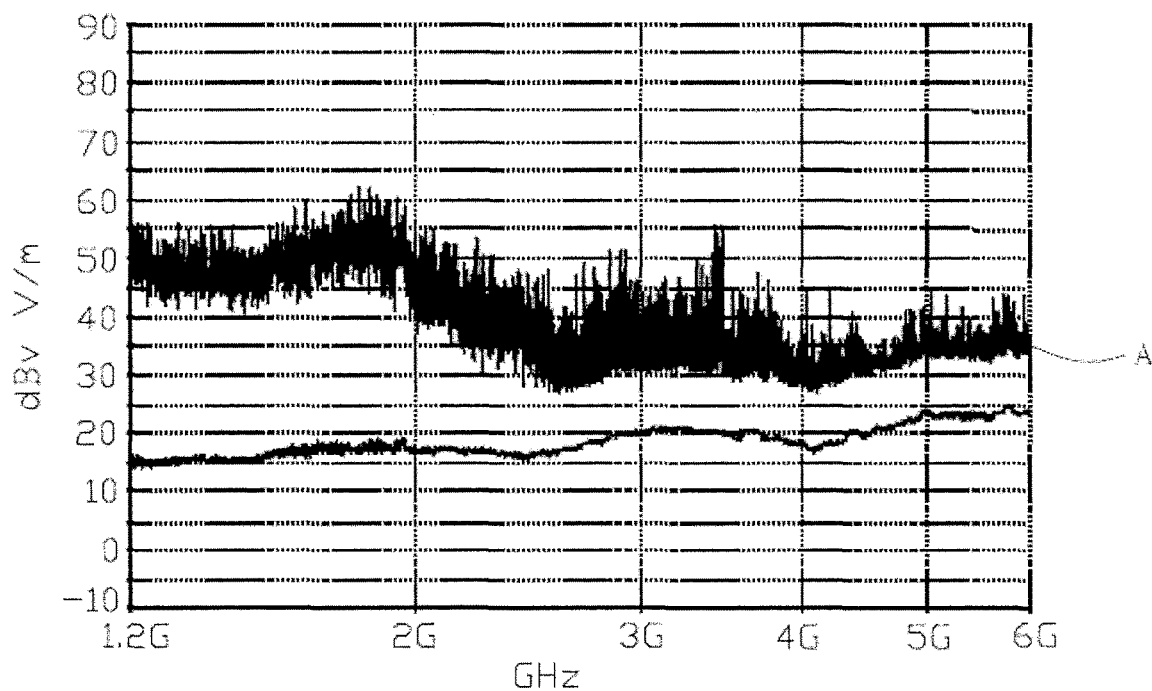
FIG. 9 is a diagram illustrating radiated EMI and conducted EMI test results of a traditional motor.

Referring also to FIG. 8 and FIG. 9, FIG. 8 and FIG. 9 are diagrams illustrating radiated EMI test results and conducted EMI test results of a traditional motor, and radiated EMI test results and conducted EMI test results of the motor 100 of the present invention, respectively. In particular, curve A represents the radiated EMI test results. The horizontal axis represents the EMI frequency of the motor, with the unit being Gigahertz (GHz). The vertical axis represents the EMI amplitude of the motor, with the unit being dBuV/m. A smaller vertical axis value indicates better EMI suppressing result. In particular, at the motor EMI frequencies of 1.5 GHz and 4.5 GHz, the noise of the motor 100 of the present invention is generally 50 dB and 35 dB, respectively, while the noise of the traditional motor is generally 60 dB and 55 dB, respectively. As can be seen, the use of the EMI suppressors 87 of the present invention can effective reduce noise, making the motor operation more stable and reliable.

In the motor 100 of the present invention, an EMI suppressor 87 is connected in series in each power supply branch circuit 85 of the brush assembly 80, and the EMI suppressors 87 are located on the main body 814 opposite from the extension portion 815, such that the circuit has an enhanced anti-EMI capability. In addition, the EMI suppressors 87 are axial capacitors perpendicular to the circuit board 81 and the end cap portion 61, and the EMIs produced by the brushes are routed to the housing through the plate member under the guide of the EMI suppressors, which further effectively reduces the electromagnetic radiation.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A motor comprising:
   a housing,
   a rotor assembly mounted in the housing,
   a stator assembly mounted in the housing,
   a commutator,
   an end cap assembly mounted to one side of the housing; and
   a brush assembly comprising:
      a circuit board;
      at least two brushes;
      a plurality of power connecting terminals for connecting with an external power supply;
      a power supply branch circuit connected in series between a corresponding one of the power connecting terminals and a corresponding one of the brushes; and
      an EMI suppressor connected between the power supply branch circuit and ground, the EMI suppressor being an axial capacitor formed by a conductor core, a cover, and a filling medium;
   wherein the end cap assembly comprises an end cap portion and a bearing seat, the end cap portion defines a first receiving chamber and a second receiving chamber at two sides thereof, and defines a through hole in communication with the first receiving chamber and the second receiving chamber, a bearing seat accommodating portion is defined in the first receiving chamber, the bearing seat comprises a plate member and a bearing sleeve disposed on the plate member, the plate member is disposed between the first receiving chamber and a bottom wall of the second receiving chamber, and the bearing sleeve is accommodated in the bearing seat accommodating portion.

2. The motor of claim 1, wherein the cover is attached around the conductor core, the filling medium is filled between the conductor core and the cover.

3. The motor of claim 1, wherein the rotor assembly comprises a shaft and a rotor core, one end of the shaft is rotatably received in the housing, and the other end sequentially passes through the rotor core and the commutator and is rotataly received in the end cap assembly; the commutator is mounted on the shaft, the commutator is electrically connected with the rotor assembly and slidably connected with the brush assembly to connect the rotor assembly to the external power supply.

4. The motor of claim 3, wherein the brush assembly is mounted on the end cap assembly, and the bearing seat is configured to receive a bearing for supporting the rotor assembly for rotation in the bearing.

5. The motor of claim 4, wherein the brush assembly further comprises at least two inductors, each inductor is connected in series to a corresponding power supply branch circuit, the two inductors are parallel to each other and are received in the first receiving chamber, and the two inductors are located at two sides of the bearing seat accommodating portion.

6. The motor of claim 4, wherein a commutator accommodating portion and at least two brush holders are disposed in the second receiving chamber, the commutator accommodating portion is in communication with and coaxially arranged with the bearing seat accommodating portion, and the commutator is received in the commutator accommodating portion.

7. The motor of claim 6, wherein the two brush holders are symmetrically disposed at a circumferential side of the commutator accommodating portion, each brush holder is in communication with the commutator accommodating portion.

8. The motor of claim 4, wherein the brush assembly comprises at least one thermal switch connected between one corresponding brush and one corresponding EMI suppressor.

9. The motor of claim 8, wherein a plurality of locking portions is disposed at the bottom wall of the second receiving chamber, the locking portions and the bottom wall and a sidewall of the second receiving chamber cooperatively define a receiving space, and the locking portions engage with the thermal switch to fix the thermal switch in the receiving space.

10. The motor of claim 4, wherein a plurality of contacting tabs is disposed on the plate member, one side of the circuit board is provided with an earth line, some of the contacting tabs pass through the first receiving chamber to connect to the earth line, and some other contacting tabs are connected to the housing.

11. The motor of claim 4, wherein the brush assembly comprises a sensor assembly mounted to one side of the circuit board, the sensor assembly comprises a Hall sensor, and the Hall sensor is connected to the external power supply.

12. The motor of claim 4, wherein the end cap portion defines at least two through holes passing through the end cap portion and in communication with the first receiving chamber and the second receiving chamber, the plate member defines engagement holes coaxial with the through holes, and each EMI suppressor is received in one corresponding through hole and one corresponding coaxial engagement hole.

* * * * *